US006321679B1

(12) United States Patent
Murrin et al.

(10) Patent No.: US 6,321,679 B1
(45) Date of Patent: Nov. 27, 2001

(54) COMBINATION LINE MARKER AND TEST STATION

(75) Inventors: Pamela L. Murrin, Fort Worth, TX (US); Mark Byerley, Chino, CA (US)

(73) Assignee: S&B Technical Products, Inc., Fort Worth, TX (US)

( * ) Notice: Subject to any disclaimer, the term of this patent is extended or adjusted under 35 U.S.C. 154(b) by 0 days.

(21) Appl. No.: 09/433,798

(22) Filed: Nov. 9, 1999

Related U.S. Application Data
(60) Provisional application No. 60/143,117, filed on Jul. 9, 1999.

(51) Int. Cl.[7] .................................................... G01D 21/06
(52) U.S. Cl. ...................................... 116/209; 116/DIG. 1
(58) Field of Search ................................ 116/209, DIG. 1

(56) References Cited

U.S. PATENT DOCUMENTS

| | | | | |
|---|---|---|---|---|
| 3,166,041 | * | 1/1965 | Caggainello | 116/209 |
| 3,523,515 | * | 8/1970 | Brown | 116/209 |
| 3,927,637 | * | 12/1975 | Sammaritano | 116/209 |
| 4,915,055 | | 4/1990 | Ptashinski | 116/209 |
| 5,200,704 | | 4/1993 | Clark, Jr. et al. | 324/326 |
| 5,234,029 | | 8/1993 | Thomas et al. | 137/559 |
| 5,568,785 | * | 10/1996 | Hazen | 116/209 |
| 5,791,098 | | 8/1998 | Thomas | 52/169.6 |

FOREIGN PATENT DOCUMENTS

0174715 * 3/1994 (JP) ........................................ 116/209

* cited by examiner

Primary Examiner—Diego Gutierrez
Assistant Examiner—Jason P. Gilchrist
(74) Attorney, Agent, or Firm—Bracewell & Patterson LLP

(57) ABSTRACT

A combination line marker and test station is shown which includes an upright support member, an internal locking sleeve and a test terminal which is supported by the locking sleeve within the upright member. A cap is engageable with the upper end of the support member for covering and protecting the exposed upper end and the internal locking sleeve and test terminal. A cupped-washer bolt is insertable within a common aperture provided within the cap and upright and is engageable with a locking nut carried by the internal locking sleeve to secure the cap to the upper end of the upright.

8 Claims, 2 Drawing Sheets

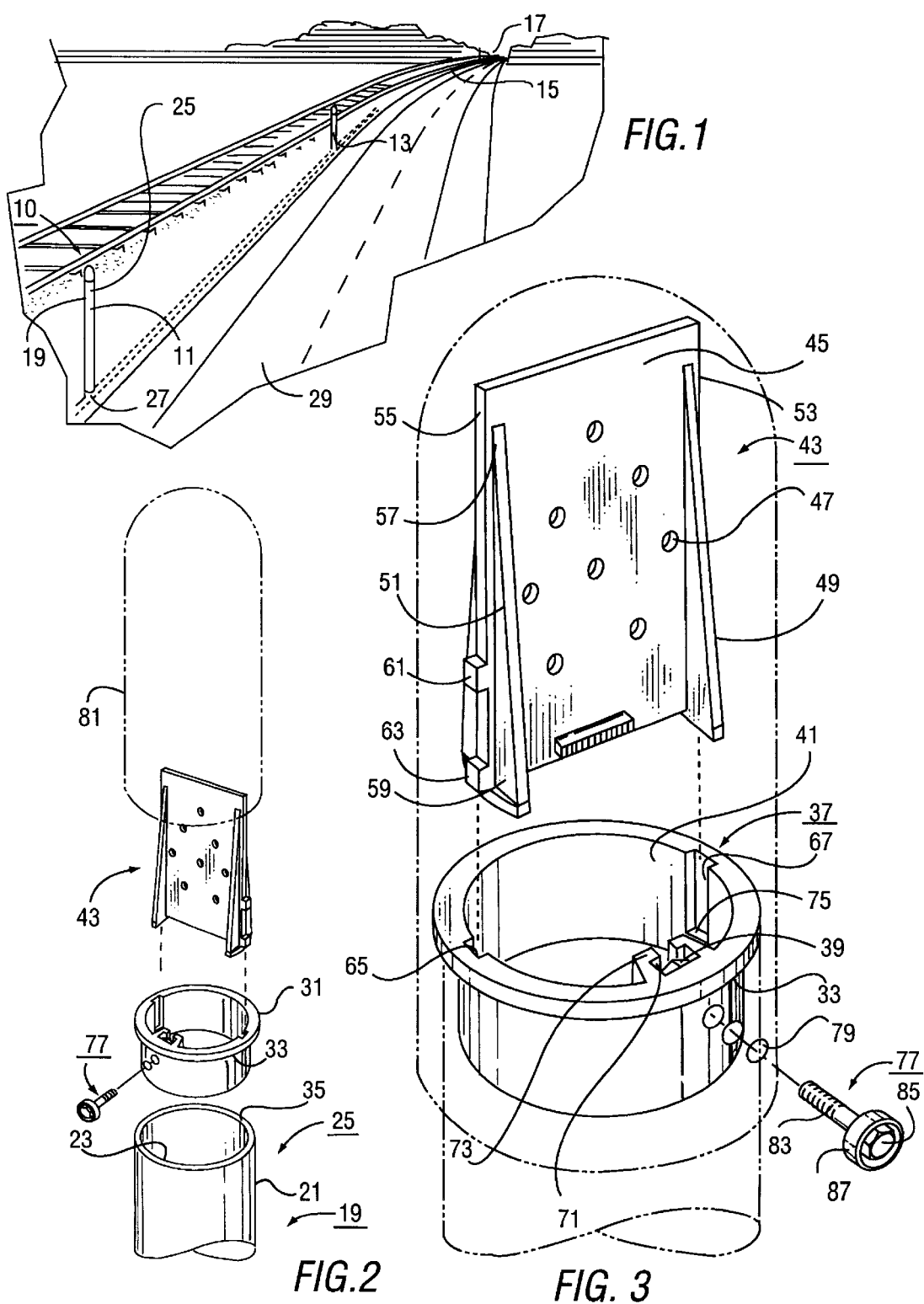

COMBINATION LINE MARKER AND TEST STATION

CROSS-REFERENCE TO RELATED APPLICATION

Benefit is herein claimed of the filing date under 35 U.S.C. §§119 and/or 120, and 37 CFR §1.78 to U.S. Provisional Patent Application Serial No. 60/143,117, filed on Jul. 9, 1999, entitled "Combination Line Marker and Test Station."

BACKGROUND OF THE INVENTION

1. Field of the Invention

The present invention relates generally to marker posts for marking the location of buried conduit and, more specifically, to marker posts for buried telecommunications cables.

2. Description of the Prior Art

A variety of pipeline or utility marking systems are in use at the present time. The purpose of these pipeline or utility marking systems is to indicate the location of buried pipeline, cable, conduit, etc., (referred to collectively as conduit herein), as well as to identify its owner. By properly marking the subterranean conduit, construction crews and others attempting to excavate the site can avoid accidentally damaging the buried conduit. The marker also serves as a warning to the general public that a buried conduit is present in the area.

In the case of the telecommunications industry, a variety of fiber optic cables are customarily run in subterranean locations, the locations being marked by marker posts which are mounted in the ground and extend vertically above ground as visual indications of the location of the cable. In order to test the integrity of the system, it is often necessary to perform diagnostic tests at regular intervals along the length of the fiber optic cable. Traditionally, these tests were performed at the marker post locations.

A need exists to provide the telecommunications industry with a lockable test station integral with the marker post which is easily accessed by field personnel.

A need also exists to provide such a combination marker post and test station with a locking mechanism which is simple in design and economical to manufacture and yet which is effective to keep unauthorized persons from accessing the test station.

SUMMARY OF THE INVENTION

A combination line marker and test station is shown including an upright support member. The upright support member has a cylindrical exterior, an initially open interior, an exposed upper end and a lower end. The lower end is positionable within a surrounding terrain in use to position the support member in an upright vertical position. An internal locking sleeve is received within the open interior of the upright support member adjacent the exposed upper end thereof. The internal locking sleeve has a terminal guide region and a locking nut both carried on an interior surface thereof. A test terminal is received on the terminal guide region of the locking sleeve for mounting the terminal within the interior of the upright support member. A cap is engageable with the upper end of the support member for covering and protecting the exposed upper end thereof containing the internal locking sleeve and test terminal. A cupped-washer bolt is insertable within a common aperture provided within the cap and upright support member and is engageable with the locking nut of the internal locking sleeve to thereby secure the cap to the upper end of the upright.

Preferably, the terminal has a planar surface with a plurality of openings therein for receiving test lead wires. The terminal can be provided with a pair of oppositely arranged flanges on either of opposing edges of the terminal planar surface, the flanges being tapered from top to bottom. The terminal region of the internal locking sleeve includes a support ledge for receiving the terminal flanges in either of two oppositely arranged directions, whereby the terminal may be inserted within the internal locking sleeve in either of two opposing directions. The preferred locking nut is a hexagonal nut which is received within a mating channel within the internal locking sleeve. The mating channel has sidewalls which contact exterior sides of the locking nut to prevent rotational movement of the nut as the cupped-washer bolt is engaged.

In one position, the terminal rests on the internal locking sleeve and extends upwardly from the upright upper end thereof, the cap serving to contain the terminal board as well as to close the initially exposed terminal and upright upper end. The terminal can also be positioned in an opposite, downwardly extending position in which the terminal extends downwardly within the interior of the upright support member. In this case, the terminal board would typically be pulled out and reset in the exposed vertical position during use.

A method is shown for protecting the integrity of a fiber optic terminal test station in which the test terminal is inserted into the terminal guide region of the locking sleeve within the interior of the upright support member. The cap is installed over the upper end of the upright member and held in place by means of a cupped-washer bolt which is insertable within a common aperture provided within the cap, upright support member and internal locking sleeve with the bolt being engageable with the locking nut of the internal locking sleeve. The cupped-washer bolt head which is exposed on the exterior of the cap and upright member is normally only accessible by a technician having a special tool which is designed to matingly engage the bolt head.

Additional objects, features and advantages will be apparent in the written description which follows.

BRIEF DESCRIPTION OF THE DRAWINGS

FIG. 1 is a perspective view of an earthen terrain showing the line markers of the invention in place beside a railroad embankment.

FIG. 2 is an exploded view of the upper end of a combination line marker and test station of the invention showing the component parts thereof.

FIG. 3 is a close-up, exploded view of the test terminal and locking sleeve of the line marker of FIG. 2 with the line marker and associated cap being shown in phantom lines.

DETAILED DESCRIPTION OF THE INVENTION

Figure 4:
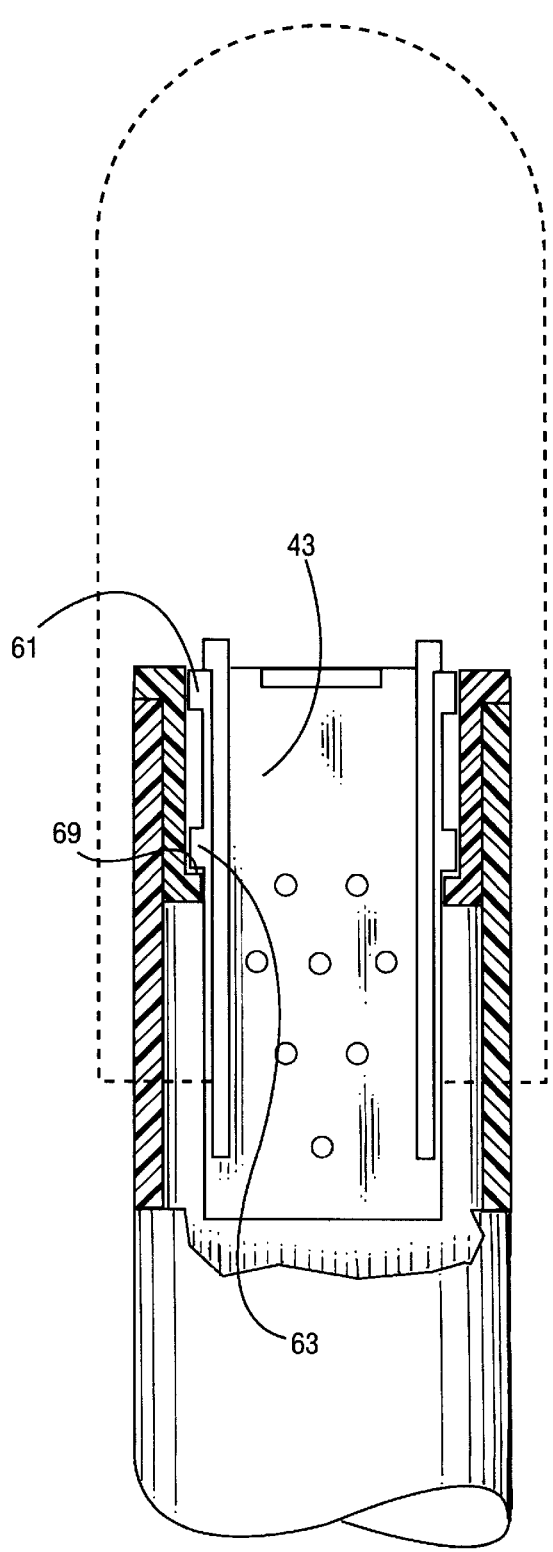
FIG. 4 is a side, cross-sectional view of the upper end of the upright support member and associated test terminal and internal locking sleeve showing the test terminal in the downwardly facing position.

FIG. 1 shows a series of marker posts used in the system of the present invention, designated generally as 11, 13, 15,

17. The marker posts are typically used for marking the location of buried conduit of various types including natural gas pipelines, petroleum pipelines, fiber optic, utility and telecommunications cable, etc. The line marker posts utilize an upright support member (19 in FIG. 1) which can be formed, for example, from ultraviolet stabilized high density polyethylene. An upright formed of this type material will not fade, warp, absorb water or otherwise deteriorate from prolonged exposure to the elements.

The overall combination line marker and test station of the invention is illustrated generally as 10 in FIG. 1. As shown in FIG. 2, the upright support member 19 has a cylindrical exterior 21, an initially open interior 23, an exposed upper end 25 and a lower end 27 (FIG. 1). As shown in FIG. 1, the lower end 27 is positionable within a surrounding terrain 29 in use to position the support member in an upright vertical position. This is commonly accomplished by providing an anchor tube (not shown) which is perpendicular to the upright member 19 in the buried position to prevent twisting or removal of the upright without excavating the entire device. The marker post is available in vivid colors that stand out against any background. A typical marker provided in, for example, 3.75 inch OD tubular design, is highly visible from any angle as well as from the air. With the addition of a fluorescent cap, visibility is enhanced for aerial observation. The cylindrical configuration of the marker posts also makes it less susceptible to "wind whip" than are flat line markers.

The components of the combination line marker and test station 10 of the invention are illustrated in FIGS. 2–5. An internal locking sleeve 31 is received within the open interior 23 of the upright support member 19 adjacent the exposed upper end 25 thereof. The internal locking sleeve 31 has a generally cylindrical exterior which terminates in an external lip region 33, allowing the locking sleeve to be mounted within the interior 23 of the support member 19 with the lip region 33 resting upon the outermost extent 35 of the upright support member.

The internal locking sleeve 31, as shown in FIG. 3 has a terminal guide region 37 and a locking nut 39 both carried on an interior surface 41, thereof.

A test terminal 43 is received on the terminal guide region 37 of the locking sleeve 31 for mounting the terminal within the interior of the upright support member. Preferably, the test terminal 43 has a planar surface 45 (FIG. 3) with a plurality of openings 47 therein for receiving test lead wires. In the embodiment illustrated in FIG. 3, the test terminal 43 has a pair of oppositely arranged flanges 49, 51 on either of the side opposing edges 53, 55 of the terminal planar surface. The flanges are tapered from the top 57 to the bottom 59, thereof. The planar exposed portions of the flanges 49, 51 are arcuate in order to matingly received within the internal surface 41 of the internal locking sleeve 31. The flanges can also be provided with spaced tabs 61, 63 which are matingly engaged within complimentary grooves 65, 67 provided within the internal surface 41 of the locking sleeve 31.

Figure 5:
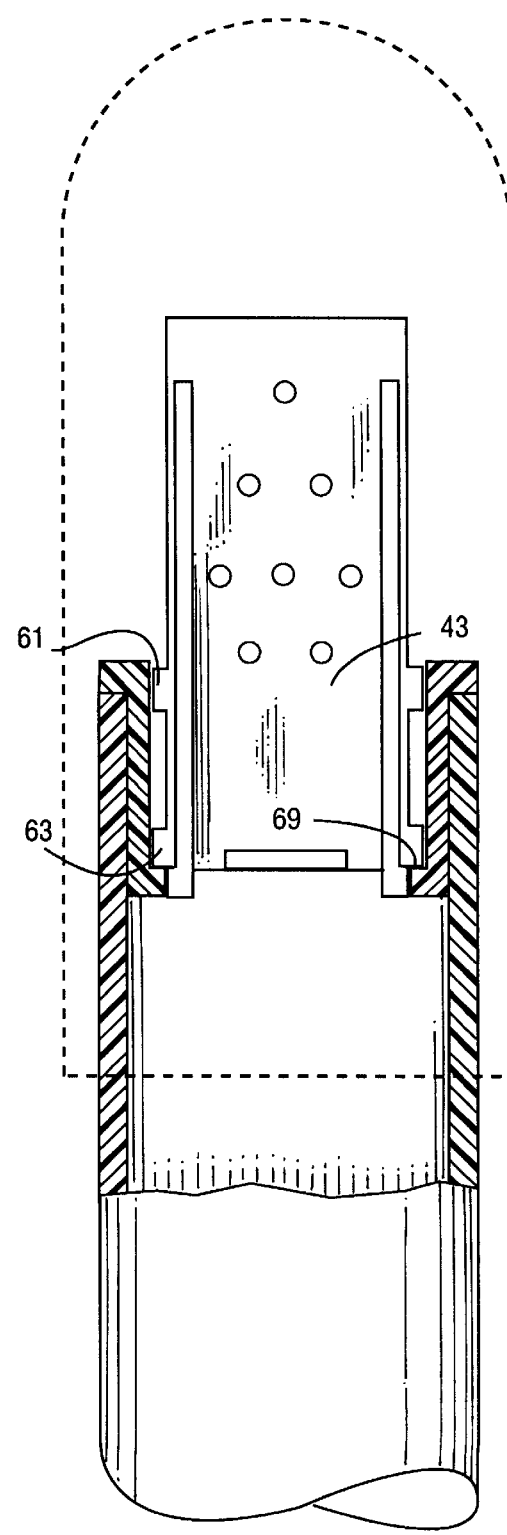
FIG. 5 is a view similar to FIG. 4 showing the test terminal mounted in the upright position.

As best seen in FIGS. 4 and 5, the internal locking sleeve 31 includes a circumferential support ledge 69 for receiving the terminal flanges 49, 51 of the test terminal in either of two oppositely arranged directions, whereby the terminal may be inserted within the internal locking sleeve in either of two opposing directions shown in FIG. 4 and 5. FIG. 4 shows the test terminal 43 inserted in the downwardly facing direction. The technician would typically remove the test terminal and insert it in the upright position shown in FIG. 5 for test operations.

As shown in FIGS. 2 and 3, the locking nut 39 is preferably a hexagonal or polygonal sided nut which is received within a mating channel 71 provided within the interior surface 41 of the internal locking sleeve 31. The channel has sidewalls 73, 75 (FIG. 3) which contact exterior sides of the locking nut 39 to prevent rotational movement of the nut as it engages a mating bolt.

As best seen in FIGS. 2 and 3, the mating bolt 77 is a cupped-washer bolt which is insertable within a common aperture 79 provided within a mating cap, indicated by phantom lines (as 81 in FIGS. 2 and 3), and through the upright support member 19 and internal locking sleeve 31. By engaging the cupped-washer bolt 77 with the locking nut 39 carried by the internal locking sleeve 31, the protective cap 81 can be engaged with the upper end of the support member for covering and protecting the exposed upper end thereof and containing the internal components including the test terminal 43.

The cupped-washer bolt 77 includes a traditional threaded shaft 83 and a polygonal head 85. However, the head 85 is surrounded by a circumferential cup region 87 which makes the head 85 inaccessible except through the use of a special mating tool. In other words, a common wrench or pliers set cannot be easily utilized to access the bolt head 85. This helps to insure the integrity of the installed system against unauthorized access. The cupped-washer bolt is accessible by technicians having specially designed tools which matingly engage the cupped-washer bolt head.

In another embodiment of the invention, the head 85 of the cupped-washer bolt 77 is provided with an "L" slot on the head 85 thereof. When the "L" slot is utilized, it is not necessary to remove the cupped-washer bolt 77 for access, as the bolt can be merely loosened.

In the method of the invention, an upright support member 19 having a cylindrical exterior and an initially open interior is mounted within a surrounding terrain 29 (FIG. 1). The lower end 27 of the upright member is positioned within the surrounding terrain by any suitable means whereby the support member is erected in upright vertical position. The test terminal 43 can be positioned within the internal locking sleeve 31 within the open interior of the upright support member adjacent the exposed upper end thereof. The test terminal 43 is inserted within the terminal guide region 37 of the internal locking sleeve 31 in either downwardly facing position shown in FIG. 4 or the upright position shown in FIG. 5. In either case, the external tabs 61, 63 of the flanges 49, 51 are supported upon the circumferential ledge 69 of the internal locking sleeve 31. The end cap 81 is then engaged with the upper end 25 of the upright support member for covering and protecting the exposed upper end thereof and for containing the internal locking sleeve and test terminal. After the cap 81 is installed over the upper end 25 of the upright member 19, the cap 81 is secured in place by means of the cupped-washer bolt 77 which is inserted through the common aperture provided within the cap, upright support and internal locking sleeve so that the bolt engages the locking nut 39. The test terminal 43 can be inserted in either of the two positions shown in FIGS. 4 and 5 of the drawings.

An invention has been provided with several advantages. The combination line marker and test station 10 of the invention provides easy access for qualified technicians to test the integrity of subterranean conduits including pipelines, cables, fiber optic conduits, and the like. In addition to identifying the location and owner of the buried conduits in question, the combination line marker and test station 10 provides an exposed test terminal for testing the integrity of fiber optic cables and other buried utility and telecommunications devices. The open interior of the post provides a protective conduit for the test leads from the buried installation to the test terminal. The test terminal is easily accessed by removing the cupped-washer bolt and removing the protective end cap. The test terminal can be easily inserted in either of two oppositely facing directions depending upon the intended end application. The cupped-washer, locking nut and internal locking sleeve provide a simple, yet effective, anti-tamper mechanism to prevent unauthorized access to the internal components of the marker.

While the invention has been shown in only one of its forms, it is not thus limited but is susceptible to various changes and modifications without departing from the spirit thereof.

What is claimed is:

1. A combination line marker and test station, comprising:
   an upright support member, the upright support member having a cylindrical exterior, an initially open interior, an exposed upper end and a lower end, the lower end being positionable with a surrounding terrain in use to position the support member in an upright vertical position;
   an internal locking sleeve located within the open interior of the upright support member adjacent the exposed upper end thereof, the internal locking sleeve having a terminal guide region and a locking nut both carried on the interior surface thereof;
   a test terminal received on the terminal guide region of the locking sleeve for mounting the terminal within the interior of the upright support member;
   a cap engageable with the upper end of the support member for covering and protecting the exposed upper end thereof containing the internal locking sleeve and test terminal;
   a cupped-washer bolt insertable within a common aperture provided within the cap, upright support member, and internal locking sleeve and engageable with the locking nut of the internal locking sleeve to thereby secure the cap to the upper end of the upright.

2. The combination line marker and test station of claim 1, wherein the terminal has a planar surface with a plurality of openings therein for receiving test lead wires.

3. The combination line marker and test station of claim 2, wherein the terminal has a pair of oppositely arranged flanges on either of opposing edges of the terminal planar surface, the flanges being tapered from top to bottom.

4. The combination line marker and test station of claim 2, wherein the terminal region of the internal locking sleeve includes a support ledge for receiving the terminal flanges in either of two oppositely arranged direction whereby the terminal may be inserted within the internal locking sleeve in either of two opposing directions.

5. The combination line marker and test station of claim 1, wherein the locking nut is a hexagonal nut which is received within a mating channel within the locking sleeve, the mating channel having sidewalls which contact exterior sides of the locking nut to prevent rotational movement of the nut as the cupped-washer bolt is engaged.

6. The combination line marker and test station of claim 1, wherein the terminal rests on the internal locking sleeve and extends from the upright upper end thereof, the cap serving to contain the terminal board as well as to close the initially exposed terminal and upright upper end.

7. A method of protecting the integrity of a fiber optic terminal test station, the method comprising the steps of:
   providing an upright support member, the upright support member having cylindrical exterior, an initially open interior, an exposed upper end and a lower end;
   positioning the lower end within a surrounding terrain whereby the support member is erected in an upright vertical position;
   providing an internal locking sleeve within the open interior of the upright support member adjacent the exposed upper end thereof, the internal locking sleeve having a terminal guide region and a locking nut both carried on an interior surface thereof;
   inserting a test terminal onto a terminal guide region of the locking sleeve for mounting the terminal within the interior of the upright support member;
   providing a cap engageable with the upper end of the support member for covering and protecting the exposed upper end thereof containing the internal locking sleeve and test terminal;
   installing the cap over the upper end of the upright member and locking the cap in place by means of a cupped-washer bolt which is inserted within a common aperture provided within the cap, upright support member and internal locking sleeve and engageable with the locking nut of the internal locking sleeve whereby the bolt secures the cap to the upright support member and internal locking sleeve to form an integral unit to protect the integrity of the fiber optic terminal test station.

8. The method of claim 7, wherein the terminal is insertable in either of two opposite directions within the upper end of the upright member.

* * * * *